United States Patent [19]
Klimek et al.

[11] 4,221,158
[45] Sep. 9, 1980

[54] PNEUMATIC ACTUATOR

[75] Inventors: Boleslaw M. Klimek, Des Plaines, Ill.; Sergio Campanini, Iola, Kans.

[73] Assignee: The Echlin Manufacturing Company, Branford, Conn.

[21] Appl. No.: 947,583

[22] Filed: Oct. 2, 1978

[51] Int. Cl.³ .................. F01B 31/00; F15B 13/042
[52] U.S. Cl. .......................... 91/440; 92/63; 92/129; 92/130 A; 92/145
[58] Field of Search .............. 92/130 A, 63, 64, 145, 92/129, 29; 91/438, 440

[56] References Cited

U.S. PATENT DOCUMENTS

| | | | |
|---|---|---|---|
| 3,109,347 | 11/1963 | Brodl et al. ............................. | 92/113 |
| 3,117,496 | 1/1964 | Dobrikin ................................ | 92/63 |
| 3,131,609 | 5/1964 | Dobrikin ................................ | 92/63 |
| 3,182,566 | 5/1965 | Berg et al. ............................. | 92/24 |
| 3,182,849 | 5/1965 | Horowitz et al. . | |
| 3,183,791 | 5/1965 | Cruse .................................... | 92/63 X |
| 3,291,004 | 12/1966 | Stevenson et al. .................... | 92/63 |
| 3,302,530 | 2/1967 | Dobrikin et al. ..................... | 92/63 X |
| 3,331,291 | 7/1967 | Rumsey ................................. | 92/63 |
| 3,401,606 | 9/1968 | Mathews et al. ..................... | 92/63 X |
| 3,406,609 | 10/1968 | Cox, Jr. ................................. | 92/63 |
| 3,502,003 | 3/1970 | Dobrikin et al. ..................... | 92/63 |
| 3,508,469 | 4/1970 | Williams ............................... | 92/63 |
| 3,581,627 | 6/1971 | Campanini ............................ | 92/63 |
| 3,636,822 | 1/1972 | Horowitz .............................. | 92/63 |
| 3,813,994 | 6/1974 | Swanders, Jr. et al. ................ | 92/63 |
| 3,908,520 | 9/1975 | Ma ........................................ | 92/63 X |

OTHER PUBLICATIONS

Anchorlok Royal Brochure, p. 2.

Primary Examiner—Irwin C. Cohen
Attorney, Agent, or Firm—Neuman, Williams, Anderson & Olson

[57] ABSTRACT

A spring brake actuator including an advantgeously formed housing having a longitudinally extending cavity therein for retaining a bolt useful in releasing spring induced brake application, and apparaus for selectively communicating fluid from one side of a spring piston of the actuator to the other side of that piston through the cavity.

17 Claims, 7 Drawing Figures

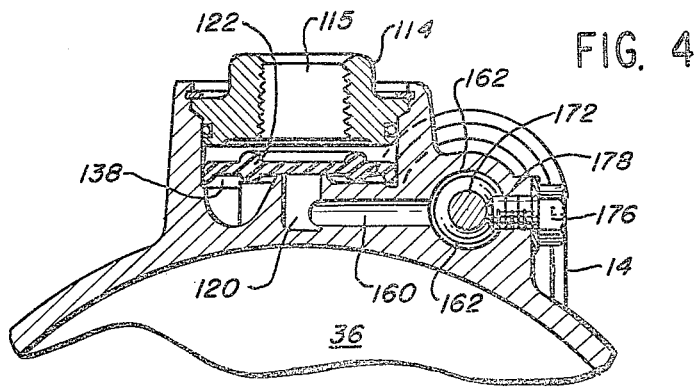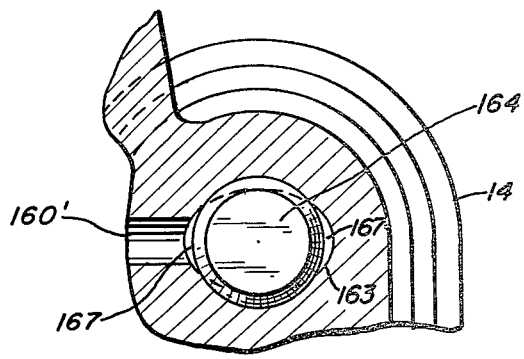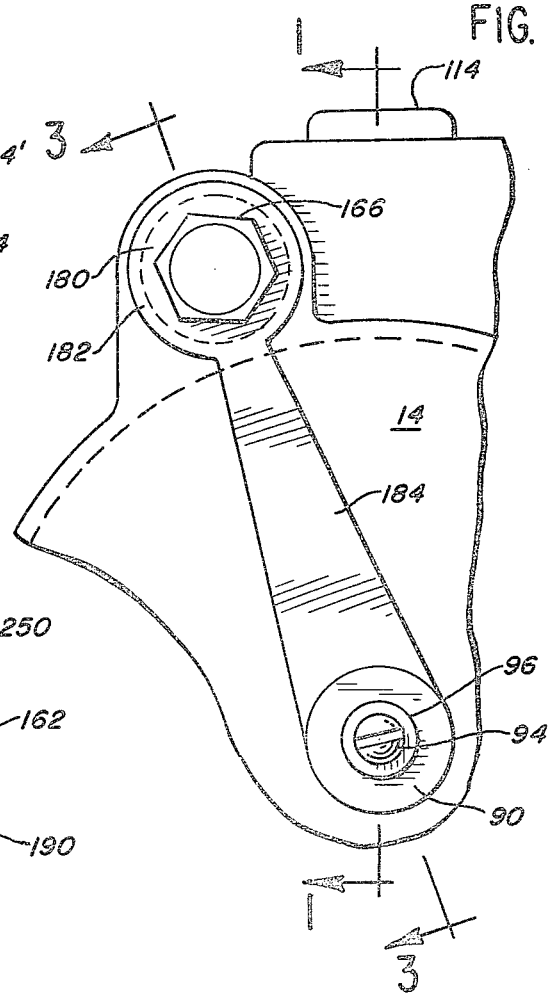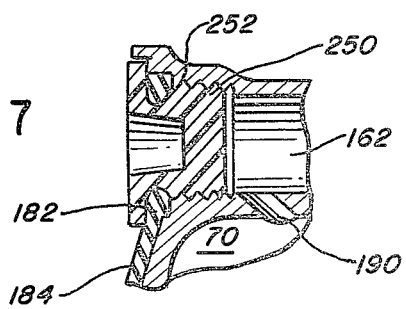

PNEUMATIC ACTUATOR

This invention relates to the field of spring brake actuators and more specifically relates to spring brake actuators including apparatus for manual release of the spring brake.

Spring brake actuators are widely used in the trucking/transport industry due to their many advantageous operational characteristics. As is well known to those skilled in the art to which this invention pertains, spring brake actuators automatically apply the brakes of a transport vehicle upon a substantial interruption in supply pressure to the actuators. This application is accomplished through the aegis of a powerful spring.

In the event that supply pressure to such an actuator is interrupted through a failure of the supply source and no supply pressure is later available to remove the applied brakes, the transport vehicle is rendered immobile. To permit release of the applied brakes in such circumstances, spring brake actuators have been constructed with manual apparatus, including various bolt assemblies, for compressing the aforementioned powerful spring within the spring brake actuator, thereby to release the brake. Exemplary of these actuators and apparatus are those shown in the following United States patents: U.S. Pat. No. 3,109,347 issued to E. J. Brodl et al. on Nov. 5, 1963; U.S. Pat. No. 3,117,496 issued to H. L. Dobrikin on Jan. 14, 1964; U.S. Pat. No. 3,131,609 issued to H. L. Dobrikin et al. on May 5, 1964; U.S. Pat. No. 3,182,566 issued to A. A. Berg et al. on May 11, 1965; U.S. Pat. No. 3,182,849 issued to C. Horowitz et al. on May 11, 1965; U.S. Pat. No. 3,302,530 issued to H. L. Dobriken et al. on Feb. 7, 1977; U.S. Pat. No. 3,331,291 issued to D. J. Rumsey on July 18, 1967; U.S. Pat. No. 3,502,003 issued to H. L. Dobrikin et al. on Mar. 24, 1970; U.S. Pat. No. 3,581,627 issued to S. Campanini on June 1, 1971; U.S. Pat. No. 3,636,822 issued to C. Horowitz on Jan. 25, 1972; and U.S. Pat. No. 3,908,520 issued to J. W. Ma on Sept. 30, 1975.

It is an object of this invention to provide an improved spring brake actuator.

It is a more specific object of this invention to provide a spring brake actuator including improved apparatus for manually releasing a spring applied brake, including an advantageously formed housing and bolt assembly.

It is a more specific object of this invention to provide a spring brake actuator having a housing adapted for both storing a brake release bolt and providing a channel for the selective equalization of pressure on opposite sides of a spring brake piston.

These and other objects and features of this invention will become apparent upon consideration of the detailed description of the illustrative embodiment which follows together with the attached drawings.

In an illustrative embodiment of this invention, a spring brake actuator includes a housing having formed therein an integral cavity disposed generally longitudinally of the actuator, for storing a bolt. The bolt may be withdrawn therefrom and employed in combination with the advantageously formed housing and a spring retaining plate to compress a powerful spring adapted to apply braking force by urging a piston (and connected braking linkage) in a predetermined direction in the absence of adequate supply pressure. The cavity is provided with appropriate passages and apparatus for permitting selective equalization of pressures on opposite sides of the piston. For a more complete understanding of this invention, reference should now be had to the embodiment illustrated in the accompanying drawings and described by way of an example of the invention.

IN THE DRAWINGS

FIG. 2 shows a partial end view of the spring brake actuator of FIG. 1.

FIG. 4 shows a partial section of the housing of the spring brake actuator of FIG. 1 in the direction of the arrows 4—4 shown in FIG. 1.

FIG. 6 shows a partial section of the alternative embodiment of the housing of the spring brake actuator of FIG. 1 in the direction of the arrows 6—6 shown in FIG. 5.

FIG. 7 shows a partial section of the housing shown in FIG. 3 with a plug installed.

DETAILED DESCRIPTION OF THE ILLUSTRATIVE EMBODIMENT

Figure 1:
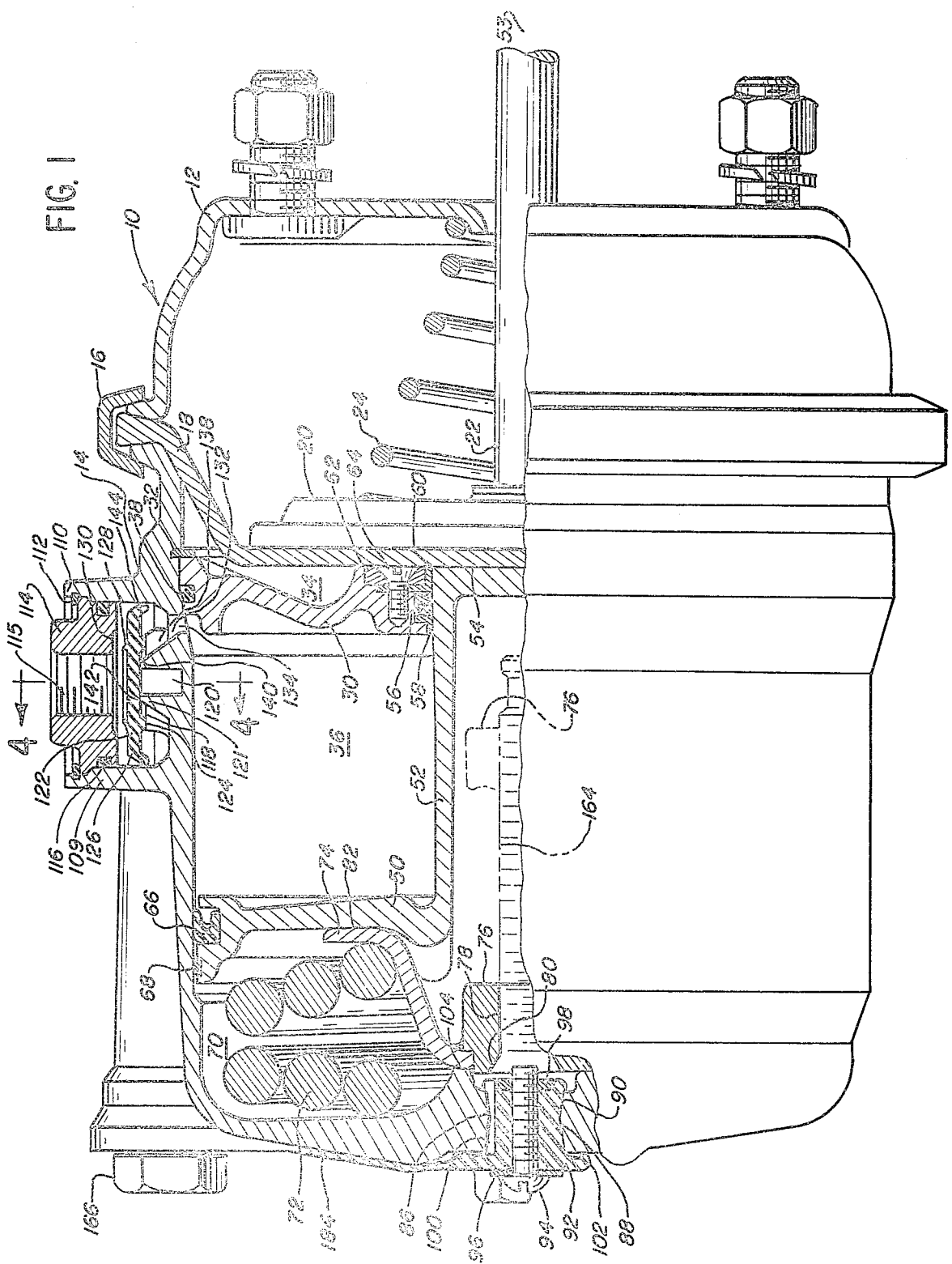
FIG. 1 shows a partial section of a spring brake actuator employing principles of this invention.

Referring to FIG. 1, a spring brake actuator embodying this invention is shown generally at 10 and includes a forward housing section 12 and a rearward housing section 14. The two housing sections are generally concave in shape and are connected together by a clamp ring 16, with a diaphragm 18 interposed between the housing sections 12 and 14. A piston 20 mounted to a brake application shaft 22 is held in engagement with the forward surface of the diaphragm 18 by a compression spring 24 which engages the forward surface of the piston 20 and the rearward surface of the housing section 12.

A bulkhead 30, maintained in position by retaining ring 32, forms chambers 34 and 36 on opposite sides thereof. A seal 38 sealingly engages the bulkhead 30 and the housing section 14. The forward chamber 34 formed between the rearward surface of the diaphragm 18 and the forward surface of the bulkhead 30 is in communication with a service port (not shown).

A piston 50 including a hollow, generally cylindrical shaped shank portion 52, axially aligned with the longitudinal axis 53 of the actuator 10 is mounted for reciprocal movement in the chamber 36. The shank portion 52 extends forwardly through the bulkhead 30 and includes a forward planar surface 54 which engages the rearward surface of the diaphragm 18. The shank 52 slidably and sealingly engages a seal 56 mounted in the bulkhead 30 between bearings 58 and 60. The bearing 60 is, in turn, mounted to the bulkhead 30 by means of countersunk washer 62 and screw 64. The piston 50 also includes a seal 66 which slidably and sealingly engages the housing section 14. A bearing 68 is also provided for facilitating reciprocal, sliding engagement of the piston 50 with the housing section 14.

The piston 50 together with the housing section 14 also forms a chamber 70 generally rearward of the piston 50. Within the chamber 70 a powerful spring 72 engages the housing section 14 and a spring retaining plate 74. The spring retaining plate 74 includes an inner hub 76 with a tapped hole 78 therein which is axially aligned with the axis 53 of the housing 10. The rearward end of the tapped hole 78 adjoins a frustoconical (countersunk) portion 80.

It should be noted that the piston 50 is formed with a rearward surface 82 for contacting the spring retaining plate 74 such that under the influence of pressure in the chamber 36 which forces the piston 50 rearwardly, the spring retaining plate 74 is also forced rearwardly of the actuator and compresses the spring 72. In the absence of such pressure, however, the spring 72 urges the spring retaining plate 74 and piston 50 forwardly to substantially a rest position where the spring is not substantially compressed. Notably the bulkhead 30 is positioned accordingly to permit such movement of the piston.

It should further be noted that the shank 52 of the piston 50 which is hollow and generally cylindrical in form is of sufficient internal diameter to avoid the possibility of interference with the hub 76 of the spring retaining plate 74 and is of sufficient length to maintain engagement of surface 54 with diaphragm 18 even when piston 50 is in its most rearward position as shown in FIG. 1.

In the rearward portion of the housing section 14 generally along the axis 53, the housing section 14 includes an aperture 86 extending through the housing and communicating with chamber 70. The aperture is formed by adjoining concave frustoconical surfaces 88 and 90 which respectively extend inwardly and outwardly from the outer and inner surfaces of the housing section 14. A sealing member or plug 92 is removably positioned within the aperture 86 for selectively sealing the aperture 86 against inflow of fluid from exteriorly of the actuator 10. To this end, the plug 92 is compressible under the influence of a bolt 94, a washer 96 and a nut 98 to firmly engage the aforementioned frustoconical surfaces 88 and 90 to prevent removal of the plug. The plug, however, also includes a channel 100 which even under compression remains open to provide communication from the chamber 70 exteriorly of the actuator, thereby providing a passage for the exhaust of fluid within the chamber 70. It should be noted that plug 92 includes a sealing portion 102 which is effective to prevent the inflow of fluid from exteriorly of the actuator but is not effective to prevent the exhaust of such fluid. Further a generally annular, though possibly circumferentially discontinuous, boss 104 extending inwardly of the housing section 14 serves to non-sealingly engage the rearward surface of the plate 74 to maintain the plate 74 at least a predetermined displacement from the aperture 86 thereby to facilitate insertion and removal of plug 92 and promote exhaust fluid flow.

Figure 3:
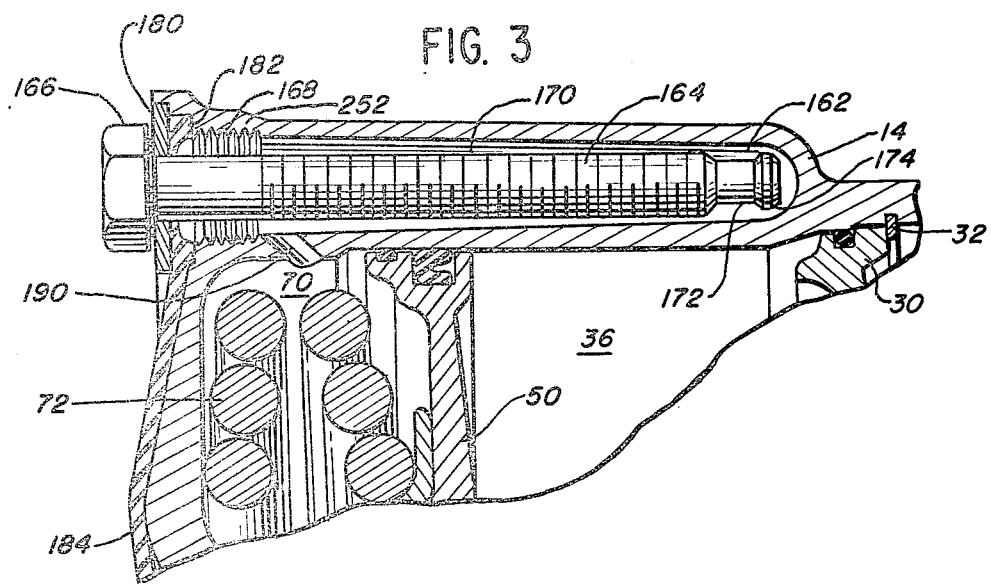
FIG. 3 shows a partial section of the housing of the spring brake actuator of FIG. 1 in the direction of the arrows 3—3 shown in FIG. 2.

Referring now to FIGS. 1, 3, and 4, the housing section 14 includes a boss 109 with an aperture 110; mounted in the aperture by means of a retaining ring 112 is a port insert 114 having port 115 formed therein. The port insert 114 includes a seal 116 which sealingly engages the boss 109. Beneath the port insert 114 a valve support 118 is formed at discontinuous points circumferentially about a generally cylindrical channel 120, in turn, formed in part by a seal setting annular boss 121. A seal member 122 having an annular protrusion 124 is positioned on the valve support 118 and is adapted to form a seal about the channel 120 upon engagement of the seal member 122 with the boss 121 under the influence of relatively elevated pressure above (as seen in FIG. 1) that portion of the member 122 over the channel 120. The seal member includes an annular extending portion 126 serving, among other things, to maintain the seal member in alignment with the boss 121. Member 122 also includes an annular seal protrusion 128 extending on the opposite side of the seal member from the protrusion 124. The protrusion 128 is positioned to selectively engage an annular valve seat 130 on the underside of the port insert 114.

It should be noted that a channel 132 is provided in the housing 14 for providing communication from the port insert 114 to the cavity 36. The channel 132 includes a lower portion 134 immediately communicating with the chamber 36 and a portion 138 generally beneath, as viewed in FIGS. 1 and 4, the seal member 122; this latter portion is partially formed by a frustoconical wall 140 of the annular boss 121. Here it should be further noted that the boss 121 terminates in an upper valve seat surface 142 which is positioned to engage the seal member 122 at a radius relative to the seal member 122 less than the radius of the annular protrusion 124. Further, the annular portion 126 of the member 122 includes an annular check valve flange 144 which prevents fluid flow from the channel 138 to port 115 while permitting flow from port 115 into channel 138 and into chamber 36 through channel 134. That notwithstanding, flow permitted by flange 144 into channel 138 from port 115 under relatively elevated pressure, is prevented by engagement of seal 122 with seating surface 142 from entering channel 120. In addition, under relatively equal pressures at port 115 and in chamber 36, the seal member 122 is seated on surface 142 and flow into channel 120 is prevented, provided the pressure in channel 120 is substantially below that at port 115. As will become apparent below, the pressure in channel 120 is maintained substantially at ambient.

The channel 120 communicates with a channel 160 (FIG. 4) which traverses laterally of the housing to communicate with a generally longitudinally extending cavity 162. A brake release bolt 164 is mounted within the cavity 162 and includes a head 166, exteriorly of the housing section 14, a shank portion 168, a threaded portion 170, a portion of reduced diameter 172, and finally a portion of increased diameter 174 relative to the portion 172. A setscrew 176 is mounted in a tapped hole 178 substantially coaxial with the channel 160 and positioned to engage the reduced diameter section 172 of the bolt 164 preferably in the vicinity of the junction of portions 172 and 174 of the bolt, thereby to retain the bolt firmly within the cavity 162. It should be noted that the bolt passes through a washer 180 and a sealing member 182 in entering the cavity 162. The sealing member 182 is connected by a preferably integral strap 184 to the aforedescribed plug 92 and serves to maintain a pneumatic seal for the cavity 162 when the bolt is in the position shown in FIG. 3 with the setscrew 176 engaging the portion 172 of the bolt. A passage 190 communicates the cavity 162 with the chamber 70 thereby providing communication from the channel 120 through the channel 160, the cavity 162 and the passage 190 into the chamber 70.

It should be noted that the bolt 164 is of appropriate diameter to be inserted through the aperture 86 after the plug 92 has been removed therefrom. Further, the bolt 164 is of sufficient length that its threaded portion 170 may engage the tapped hole 78 of the hub 76 when the hub 76 and thus the spring plate 74 and piston 50 are in their most forward positions relative to the actuator 10 (the most forward position of the hub 76 with the bolt 164 inserted as stated above is shown in partial phantom in FIG. 1). In addition, the portions 172 and 174 of the bolt are of appropriate dimensions not to interfere with the shank 52 of the piston 50 when the bolt 164 is so inserted.

In operation with the plug 92 in the position as shown in FIG. 1, and the bolt 164 positioned as in FIG. 3 in cavity 162, supply pressure is communicated to the port 115 from an external source (not shown). That pressure is communicated past the sealing member 122 through the channel 132, but not through the channel 120, to the chamber 36 where it acts upon the piston 50 and moves the piston rearwardly to the position shown in FIG. 1. Simultaneously the spring plate 74 is moved rearwardly and compresses the spring 72; assuming service pressure in chamber 34 is ambient, the spring 24 returns the piston 20 and the diaphragm 18 to the positions shown in FIG. 1. It should be noted that the movement of the piston 50 rearward in the housing acts to increase the pressure in the chamber 70; however, that pressure is relieved through the exhaust channel 100. Thus, the pressure in the chamber 70 does not substantially exceed ambient pressure.

In the event that source pressure is lost at the port 115, the relatively heightened pressure in the chamber 36 and, thus, on the underside of the sealing member 122, causes the sealing member to seat its protrusion 128 against the valve seat 130 on the port insert 114. Moreover, fluid passes from the chamber 36 through the channels 132, 120, and 160 to the cavity 162 and through that cavity and the passage 190 into the chamber 70. Since, however, the chamber 70 is maintained at substantially ambient pressure by being in constant communication with the exhaust channel 100, the fluid in the chamber 36 is effectively vented reducing the pressure therein and permitting the spring 72 to force the spring plate and piston forwardly of the chamber. As a result, the surface 54 of the piston urges the diaphragm 18 and, thus, the piston 20 forwardly of the actuator and braking force is applied.

It should here be noted that air is transferred through the above-described operation from the chamber 36 to the chamber 70 and such excess air as would have established a substantially positive pressure (above ambient) in chamber 70 is exhausted through channel 100. Further, the chamber 70 is not permitted to develop a substantially negative pressure relative to ambient as a result of the movement of the piston 50 forwardly of the actuator. In fact, pressure is equalized between the chambers 70 and 36 without the need for drawing air into the chamber 70 from exteriorly of the actuator. As a result, the internal workings of the actuator are not subjected to contamination borne in ambient air.

With the piston moved forwardly of the actuator under the influence of the spring 72 and in the absence of appropriate source pressure, it may become desirable to release the applied braking force, for example, to permit emergency movement of the vehicle. In that event upon appropriate reduction in the compression of the plug 92 by unscrewing the screw 94 from the nut 98, the plug 92 is withdrawn from the aperture 86. It should be noted here that the strap 184 connected to the plug 92 at this point prevents the plug from being detached fully from the actuator.

Thereupon, the setscrew 176 is withdrawn from engagement with the bolt portion 172 and the bolt 164 together with the washer 180 is withdrawn from the cavity 162. The bolt is then inserted through the washer 180 into the aperture 86. The portion 174 of the bolt is guided by the frustoconical section 80 of the hub 76 toward the tapped hole 78. Thereafter, appropriate engagement of the threads of the portion 170 of the bolt 164 with the tapped hole 78 moves the spring retaining plate 74 rearwardly of the actuator and compresses the spring 72. As a result, the piston 20 and the piston 50 are moved rearwardly under the influence of the spring 24 and brake application force is reduced. At the point that the spring plate 74 assumes the position shown in FIG. 1 all brake application through the aegis of spring 72 force has been removed.

Figure 5:
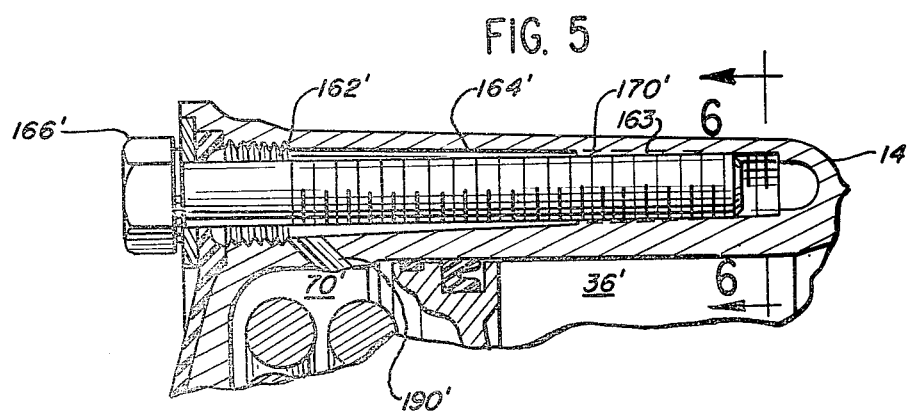
FIG. 5 shows a partial section of an alternative embodiment of the housing of the spring brake actuator of FIG. 1 in the direction of the arrows 3—3 shown in FIG. 2.

Numerous alternative structures for accomplishing the function of the cavity 162 and the bolt 164 will become apparent to those skilled in the art to which this invention pertains. Among these, however, is that shown in FIGS. 5 and 6 in which the cavity 162' includes a portion 163 generally elliptical in cross-section (FIG. 6) with normal helical threads impressed upon the elliptical shape of the cavity. As a result, when the threaded portion 170' of the bolt 164' engages the threads of the portion 163, passages 167 along opposite sides of the bolt provide for communication to channel 190'. As a result, communication as previously described may be effected from the cavity 36' to the cavity 70'.

In the event that it is desired to remove the bolt 164 from the cavity 162 (FIG. 3) without affecting the operation of the actuator as, for example, to prevent unauthorized personnel from releasing spring brakes following loss of supply pressure, a threaded plug 250, as shown in FIG. 7, is inserted in the cavity 162 and engages threads 252 in the walls of the housing 14. This plug in combination with the seal 182 maintains the pressure integrity of the cavity 162.

From the above it should be apparent that structure embodying this invention achieves an economy of size, complexity and weight by increasing the functionality of the cavity 162 over that which is known in the prior art in that the cavity 162 performs not only a fluid communication function but also a function related to brake force release apparatus. Further, the connection of plug 92 to seal 182 through strap 184 decreases the chance of loss of either of these elements by improving their visibility through increase in apparent size.

The above description is directed to a specific, preferred, and an alternative, illustrative embodiment of this invention. It is not intended, however, that the invention be limited to the illustrative embodiments; rather, those skilled in the art to which this invention pertains will recognize numerous additional embodiments of the principles of this invention upon reading this disclosure. Therefore, it is intended to encompass within this invention all those embodiments within the true spirit and scope of the following claims.

What is claimed is:

1. A pneumatic actuator comprising:
   a housing including a first cavity, an aperture open to said first cavity, and a second cavity extending generally longitudinally of said housing and open at one end;
   a piston mounted for reciprocal movement within said first cavity, said piston forming a first chamber on one side of said piston and a second chamber on the other side of said piston within said first cavity, said second cavity being in communication with said first and second chambers;
   spring means within said first chamber for urging said piston in a predetermined direction; and means normally mounted within said second cavity for selectively sealing said open end of said second cavity while permitting communication between said first and second chambers and including means for cooperatively operating with said spring means upon removal of said mounted means from said second cavity and insertion through said aperture to selectively control the effect of said spring means upon said piston.

2. An actuator according to claim 1 wherein said spring means comprises a compression spring and a spring retaining plate for engaging said compression spring and said piston and for receiving said operating means.

3. An actuator according to claim 2 wherein said operating means comprises a threaded bolt, and wherein said spring retaining plate includes a hub having a tapped hole therein in alignment with said aperture, said bolt being engageable with said tapped hole.

4. An actuator according to claim 3 further comprising removable means for selectively inhibiting communication through said aperture.

5. An actuator according to claim 1 further comprising means for providing selective communication between said first chamber and said second chamber via said second cavity.

6. An actuator according to claim 5 wherein said aperture provides communication for said first chamber.

7. An actuator according to claim 6 wherein said spring means comprises a compression spring and a spring retaining plate for engaging said spring means and said piston and for receiving said operating means.

8. An actuator according to claim 7 wherein said operating means comprises a bolt, and wherein said spring retaining plate comprises a hub having a tapped hole therein aligned with said aperture and adapted to cooperatively operate with said bolt.

9. An actuator according to claim 8 wherein said piston includes a hollow cylindrical shank of sufficient length to accomodate said bolt when said bolt is maximally disposed within said first cavity and said piston is maximally disposed toward said first chamber.

10. An actuator according to claim 9 further comprising a removable plug means for preventing communication in one direction through said aperture but permitting communication in the opposite direction through said aperture, for use in said aperture when said bolt is mounted in said second cavity.

11. An actuator according to claim 10 wherein said sealing means comprises a seal for cooperative operation with said bolt when said bolt is mounted in said second cavity to normally seal said open end.

12. A pneumatic actuator comprising:
a housing including a first cavity, an aperture open to said first cavity, and a second cavity extending generally longitudinally of said housing and open at one end;
a piston mounted for reciprocal movement with said first cavity and including a hollow cylindrical shank, said piston forming a first chamber on one side of said piston and a second chamber on the other side of said piston within said first cavity, said second cavity being in communication with said first and second chambers and said aperture providing exhaust communication for said first chamber;
means for providing selective communication between said first and second chambers via said second cavity;
a compression spring and a spring retaining plate which engages said compression spring and said piston being mounted in said first chamber, said spring urging said piston in a predetermined direction and said retaining plate including a hub having a tapped hole therein which is aligned with said aperture;
means normally mounted within said second cavity and permitting communications between said first and second chambers for releasing said actuator including a bolt for engaging said tapped hole in said hub upon removal of said bolt from said second cavity and insertion through said aperture to selectively control the effect of said compression spring upon said piston, said hollow cylindrical shank of said piston being of sufficient length to accommodate said bolt when said bolt is maximally disposed within said first cavity and said piston is maximally disposed toward said first chamber;
seal means for cooperative operation with said bolt while said bolt is mounted in said second cavity to seal said open end of said second cavity;
a removable plug means for preventing communication in one direction through said aperture but permitting communication in the opposite direction through said aperture for use in said aperture while said bolt is mounted in said second cavity; and
means for connecting said plug and said seal means.

13. A pneumatic actuator comprising:
a housing including a first cavity, an aperture open to said first cavity, and a second cavity extending generally longitudinally of said housing and open at one end;
a piston mounted for reciprocal movement within said first cavity, said piston forming a first chamber on one side of said piston and a second chamber on the other side of said piston within said first cavity, said second cavity being in communication with said first and second chambers;
a removable plug means for preventing communication in one direction through said aperture but permitting communication in the opposite direction through said aperture;
spring means within said first chamber for urging said piston in a predetermined direction;
means normally mounted within said second cavity for selectively sealing said open end of said second cavity while permitting communication between said first and second chambers and including means for cooperatively operating with said spring means upon removal of said mounted means from said second cavity and insertion through said aperture to selectively control the effect of said spring means upon said piston, said sealing means including a seal adapted to be disposed about said open end of said second cavity; and
means for connecting said plug to said seal.

14. A pneumatic actuator for use with a source of supply pressure comprising:
a housing including a cavity;
a piston mounted for reciprocal movement within said housing in said cavity, said piston dividing said cavity into first and second chambers;

means adapted for communicating fluid from such a source of supply pressure to said second chamber;

a compression spring mounted in said first chamber for urging said piston to reduce the volume of said second chamber;

means for engaging said compression spring; and means for communicating fluid from said second chamber to said first chamber restraining means normally stored in said communicating means and permitting communication between said first and second chambers, and said restraining means being adapted upon removal from said communicating means to cooperatively operate with said engaging means to restrain said compression spring.

15. A pneumatic actuator for use with a source of supply pressure comprising:

a housing including a cavity;

a piston mounted for reciprocal movement within said housing in said cavity, said piston dividing said cavity into first and second chambers;

means for communicating fluid from said source of supply pressure to said second chamber;

a compression spring mounted in said first chamber for urging said piston to reduce the volume of said second chamber;

means for engaging said compression spring;

restraining means adapted to cooperatively operate with said engaging means to restrain said compression spring, said restraining means comprising a generally cylindrical, helically threaded bolt; and means for communicating fluid from said second chamber to said first chamber and for storing said restraining means and comprising a channel of generally non-cylindrical crosssection, bearing generally helical threads, said threads of said bolt being adapted for engaging said threads of said channel while permitting communication between said first and second chambers.

16. A pneumatic actuator comprising:

a housing including a first cavity;

a piston mounted for reciprocal movement within said housing in said first cavity, said piston forming in said first cavity at least one chamber;

spring means in said chamber for urging said piston in a predetermined direction;

retainer means for retaining said spring means;

communicating means in said housing for selectively providing communication from one side of said piston to the other, said communicating means comprising a second cavity in said housing wherein said retainer means is normally stored while permitting communication from one side of said piston to the other; and means for securing said retainer means within said second cavity.

17. An actuator as in claim 16 wherein said securing means comprises a set screw sealably inserted through the sidewall of said second cavity and engaging said retainer means.

* * * * *